United States Patent [19]

Fooke

[11] 4,103,703

[45] Aug. 1, 1978

[54] MULTISTAGE PILOT-CONTROLLED PRESSURE-REDUCING VALVE

[75] Inventor: Johannes Fooke, Lohr, Main, Fed. Rep. of Germany

[73] Assignee: G. L. Rexroth GmbH, Lohr, Main, Fed. Rep. of Germany

[21] Appl. No.: 747,546

[22] Filed: Dec. 6, 1976

[30] Foreign Application Priority Data

Dec. 5, 1975 [DE] Fed. Rep. of Germany ....... 2554670

[51] Int. Cl.² .............................................. G05D 7/01
[52] U.S. Cl. .................................................... 137/501
[58] Field of Search ................................ 137/500–504

[56] References Cited

U.S. PATENT DOCUMENTS

| | | | |
|---|---|---|---|
| 1,467,522 | 9/1923 | Amsler | 137/501 |
| 3,112,764 | 12/1963 | Anderson et al. | 137/504 |
| 3,978,891 | 9/1976 | Vick | 137/501 X |

*Primary Examiner*—Robert G. Nilson
*Attorney, Agent, or Firm*—Michael J. Striker

[57] ABSTRACT

A flow-control valve assembly for connection between a source of fluid under pressure and a fluid-operated load has a main valve and a pilot valve. The main valve defines a continuous flow path having an input end connectable to the source of fluid under pressure and an output end. This valve further has a valve member which defines with the housing of the main valve a plurality of variable flow restrictions, the valve member being displaceable in the main-valve housing between an open position wherein the restrictions are all of maximum flow cross section and a closed position wherein the restrictions are all of minimum flow cross section. A pilot valve has an input side connected to the output end of the continuous flow path through the main valve and an output side connectable to the load. The valve member of the main valve is displaced toward the open position when the pressure differential across the pilot valve decreases below a predetermined level and is displaced into the close position when this pressure differential increases above a predetermined level. A relatively soft spring biases the valve member into the open position.

7 Claims, 3 Drawing Figures

MULTISTAGE PILOT-CONTROLLED PRESSURE-REDUCING VALVE

BACKGROUND OF THE INVENTION

The present invention relates to a flow-control valve. More particularly this invention concerns a pilot-controlled, flow-control valve usable for reducing the pressure between a source of fluid under pressure and a fluid-operated load.

A pilot-controlled pressure-reducing valve has a fluid-flow path whose input end is connected to a source of fluid under pressure and whose output end is connected to a fluid-operated load. A valve member along this path forms a restriction therein which is of variable flow cross section. A pilot valve sensitive normally to the pressure or flow at the output side of the flow-control valve establishes the position of its valve member and, therefore, determines the size of the flow cross section through the valve and the pressure drop created thereby.

Such a valve arrangement is relatively effective and can be made quite sensitive. It has, however, the considerable disadvantage that the considerable pressure drop normally effected at the single valve member can cause rapid wear of the control surfaces that form the pressure-controlling restriction. In particular when used in a hydraulic system wherein the hydraulic fluid is water cavitation becomes a considerable problem. This leads to relatively rapid wearing-out of the valve.

SUMMARY OF THE INVENTION

It is therefore an object of the present invention to provide an improved flow-control valve.

Another object is the provision of a flow-control or pressure-reducing valve of the pilot-controlled type which has a very long service life.

Yet another object is to provide such an improved valve which can be produced at relatively low cost.

These objects are obtained according to the present invention in a pilot-controlled, flow-control valve comprising a main valve defining a continuous flow path having an input end connectable to a source of fluid pressure and an output end. This valve has a valve member defining a plurality of variable flow restrictions along the path, the valve member being displaceable in the main valve between an open position wherein the restrictions are all of maximum flow cross section and a closed position wherein the restrictions are all of minimum flow cross section. A pilot valve has an input side connected to the output end of the flow path and an output side connectable to the load. Means is connected between the sides of the pilot valve and the valve member for displacing the valve member toward the open position when the pressure differential across the pilot valve decreases below a predetermined level and for displacing the member toward the closed position when the pressure differential across the pilot valve increases above a predetermined level.

Thus with the system according to the present invention the main pressure drop is effected in a plurality of stages at a plurality of ganged flow restrictions. Thus, the overall pressure drop at any single flow restriction is relatively reduced so that the above-mentioned wear and cavitation problems are obviated. For this reason the overall service life of such a valve is increased considerably.

According to another feature of this invention the main valve has a housing formed with an elongated chamber and the valve member is a spool longitudinally displaceable in this chamber. The housing is formed with at least one pair of longitudinally spaced housing ports opening into the chamber and the spool is formed with at least one pair of longitudinally spaced spool ports alignable with the housing ports. This spool is further formed with a compartment interconnecting the spool ports. Each spool port therefore forms with the respective housing port a respective one of the above-mentioned restrictions whose flow cross section is therefore variable by longitudinal displacement of the spool in the housing. The means for displacing the valve member includes a conduit connected to the input side of the pilot valve and to the housing chamber for applying the pressure at the input side to the spool in one direction and another conduit connected to the output side of the pilot valve and to the chamber for applying the pressure at the output side to the spool in the opposite direction.

Furthermore, according to yet another feature of this invention the main valve comprises a spring which exerts a force of at most 10 bars on the valve member in the same direction as the pressure from the output side of the pilot valve, that is in a direction urging the restrictions toward greater flow cross section. The spool has a pair of oppositely directed surfaces, at least one of which may be constituted as two parts, and the pressure from the input side of the pilot valve is applied to one of these surfaces whereas the pressure from the output side is applied to the other surface.

According to yet another feature of the present invention the housing is formed with two such pairs of housing ports and with a passage or chamber connecting one of the housing ports of one of the pairs of housing ports with one of the housing ports of the other of the pairs of housing ports. The other housing port of the one pair of housing ports is the input end of the path and the other housing port of the other pair is the output end of the path. The spool is formed with two such compartments and with two such spool ports opening into each compartment. Thus each spool port is alignable with a respective housing port. The housing and spool ports are longitudinally equispaced and of the same longitudinal length so that the flow cross section of each restriction formed by a respective housing port and a respective spool port will be the same as the flow cross section of any of the others, regardless of the position of the spool relative to the housing.

The novel features which are considered as characteristic for the invention are set forth in particular in the appended claims. The invention itself, however, both as to its construction and its method of operation, together with additional objects and advantages thereof, will be best understood from the following description of a specific embodiment when read in connection with accompanying drawings.

SPECIFIC DESCRIPTION OF A PREFERRED EMBODIMENT

Figure 1:
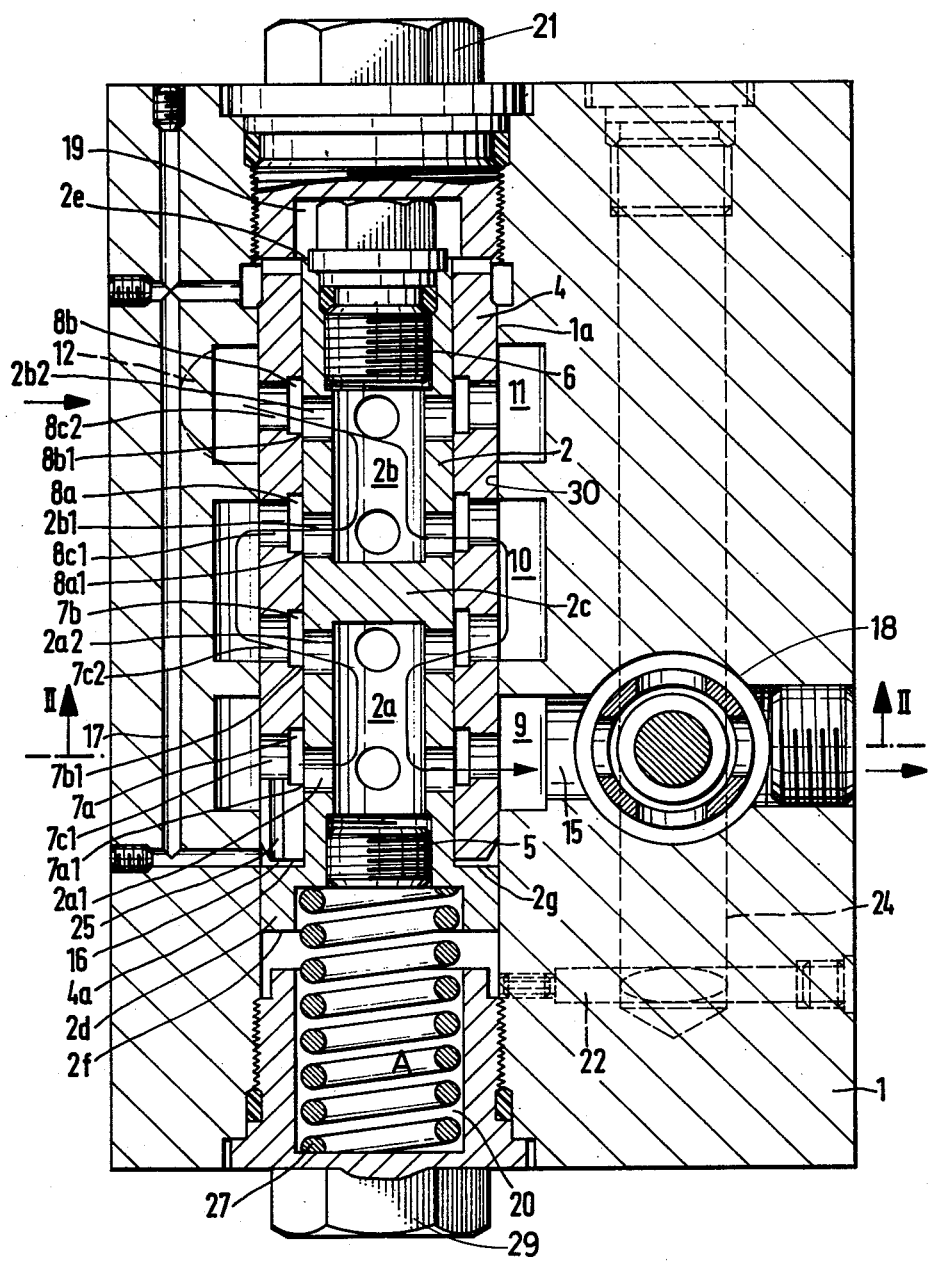
FIG. 1 is a vertical section taken through a valve assembly according to this invention.
Figure 2:
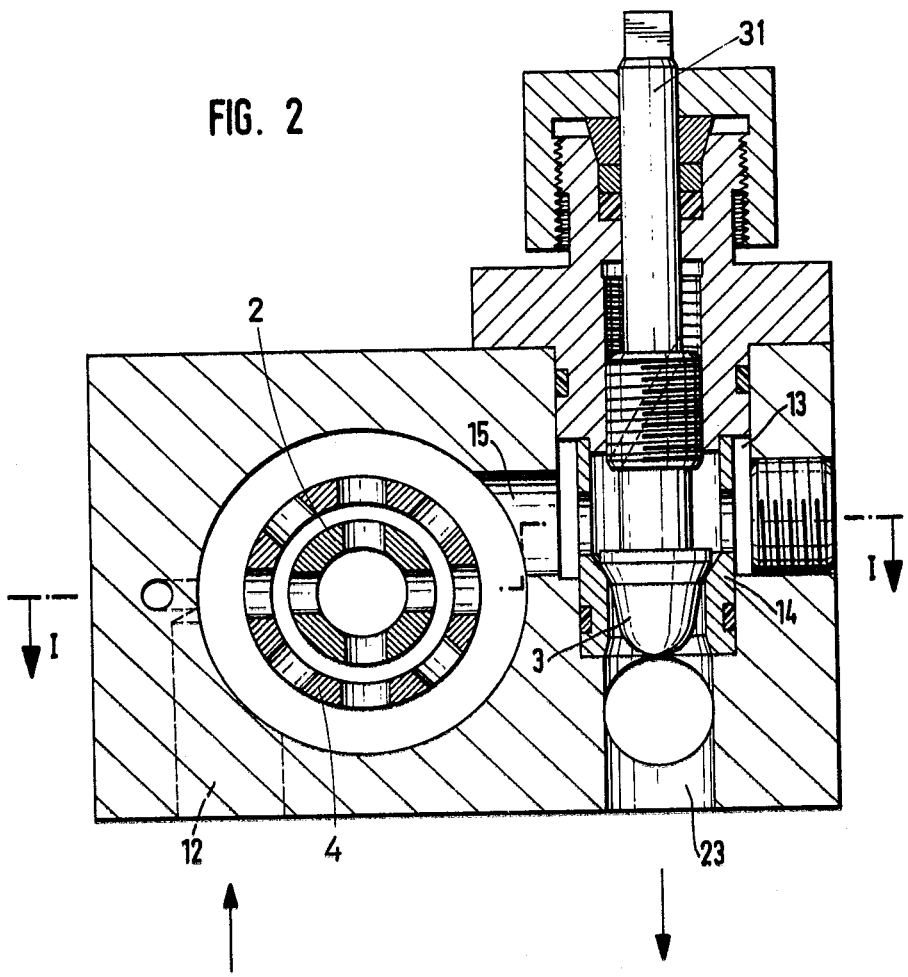
FIG. 2 is a section taken along line II—II of FIG. 1, line I—I of FIG. 2 indicating the section plane of FIG. 1.

The flow-control valve according to the present invention as shown in FIGS. 1 and 2 basically comprises a block-type steel housing 1 formed with a throughgoing cylindrical bore 30, one of whose ends is closed and sealed by means of a plug 29 and in which is provided a cylindrical sleeve 4 having a closed and threaded end portion 21 sealing the opposite end of the bore or chamber 30. Within and coaxial with this bore 30 and sleeve 4 there is provided an axially or longitudinally displaceable spool or piston 2 which is shown in FIG. 1 in the upper and open position, but is movable downwardly from the indicated position. In addition the housing is provided with a pilot valve 18 having as shown in FIG. 2 a pilot-valve body 3 juxtaposable and fittable snugly against a seat 14. A threaded shaft 31 allows the relative positions of the elements 3 and 14 to be varied so that the flow cross section through the valve 18 can be varied by rotation of this shaft 31.

The spool 2 is formed with a lower cylindrical compartment 2a and an upper cylindrical compartment 2b. The lower cylindrical compartment 2a is sealed at its upper end by means of a partition 2c integrally formed with the spool 2 and at its lower end by a threaded plug 5. Furthermore, this compartment 2a, which is coaxial with the spool 2, sleeve 4, and a chamber 30, is provided in its lower region with four angularly equispaced throughgoing holes or ports 2a1 and in its upper region with four indentical such ports 2a2. The holes or ports 2a1 and 2a2 are of identical diameter and cylindrical shape, with the central axes of all of the ports 2a1 lying on a common plane orthogonal to the axis A of the assembly and of the ports 2a2 similarly lying on another respective plane orthogonal to this axis A. The upper compartment 2b is defined on its lower side by means of the partition 2c and on its upper side by means of another threaded plug 6. This compartment is formed, like the compartment 2a, with four radially open lower ports 2b1 and four radially open upper ports 2b2. The axial spacing between the ports 2a1 and 2a2 is equal to that between the ports 2a2 and 2b1 and in turn equal to that between the ports 2b1 and 2b2.

The sleeve 4 is formed at the level of the ports 2a1 with an inwardly open annular groove 7a, at the level of the ports 2a2 with a groove 7b, at the ports 2b1 with a groove 8a, and at the ports 2b2 with a groove 8b. These grooves 7a, 7b, 8a and 8b are axially equispaced like the corresponding ports. The housing 1 is formed inside the bore 30 at the level of the groove 7a with an axially relatively long inwardly open groove 9 which communicates with the groove 7a via a plurality of radially opening angularly equispaced holes or ports 7c1. The housing 1 is also formed in the bore 30 at the level of the two grooves 7b and 8a with another passage-defining groove 10 that communicates with these grooves 7b and 8a via respective radially open holes 7c2 and 8c1. Finally, the housing 1 is formed at the region of the groove 8b in the hole 30 with a radially inwardly open compartment-defining groove 11 that communicates with this groove 8b by means of four angularly equispaced radially throughgoing ports 8c2 identical to the ports 7c1, 7c2, and 8c1. The grooves 7a, 7b, 8a, and 8b define control surfaces 7a1, 7b1, 8a1, and 8b1 for the respective ports 2a1, 2a2, 2b1, and 2b2.

The pilot valve 18 has an input side 13 which communicates via a passage 15 with the groove or chamber 9, and has an output side 23 connected to a bore 24 formed in the housing 1. Similarly, the chamber or groove 11 opens into a bore or input line 12.

The piston 2 has at its lower end a large-diameter section 2d which is of the same outside diameter as the sleeve 4 and can reciprocate between the lower end 4a of the sleeve 4 and the upper end of the plug 29. This portion 2d has a downwardly turned surface 2f which forms with the bore 30 and the plug 29 a pressurizable spring chamber 20 in which is provided a compression spring 27.

In addition between the lower end 4a of the sleeve 4 and the upper surface 2g of the portion 2d there is defined a chamber 16 connected via a passage 17 with another chamber 19 defined between the upper portion 21 of the sleeve 4 and the upper surface 2e of the piston 2. The chamber 16 communicates with at least one of the bores 7c1, and therethrough with the chamber 9 by means of an axial bore or passage 25 formed in the sleeve 4. Similarly, the spring room or chamber 20 communicates via a passage 22 with the passage or bore 24.

Thus, there is defined a fluid path through the valve which passes from the input line 12 through the chamber 11, the compartment 2b, the chamber 10, the compartment 2a, and the chamber 9 to the input side 13 of the valve 18. The pressure at this input side 13 is fed via the passage 25 to the chambers 16 and 19 and is effective to press the piston 2 downwardly in the sleeve 4. At the same time the pressure downstream or at the output side 23 of the valve 18 is fed via passage 22 to the chamber 20 and is effective in the exact opposite direction on the piston 2. The total effective area of the surfaces 2e and 2g is equal to the total effective area of the surface 2f, so that if the pressure on both sides of the valve 18 is equal and the spring 10 is not taken into consideration the valve member constituted by the spool 2 should not move in the sleeve 4. The spring 20, however, biases the spool 2 upwardly into the illustrated position with a force equal to five bars (1.0 bar = 0.987 atm.). Thus, the force of the spring 20 adds itself to the force of the fluid pressure at the output side 23 of the valve 18.

Figure 3:
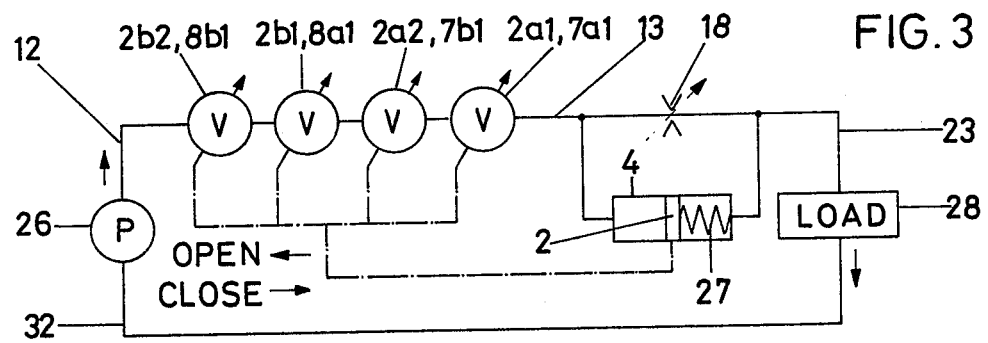
FIG. 3 is a schematic and partly diagrammatic illustration of the system according to this invention.

The device functions as follows, reference being made to schematic FIG. 3 which shows that a pump 26 is connected to the input line 12 and a load 28 is connected to the output side 23 of the valve 18. The load 28 and pump 26 are otherwise connected together in a return line 32. Here it is apparent that as the fluid flows along the above-described path from the pump 26 to the valve 18 it will pass through a first restriction constituted by the ports 2b2 and control surface 8b1, then through a second restriction constituted by the ports 2b1 and the control surface 8a1, then through a third restriction constituted by the ports 2a2 and control surface 7b1, and finally through a fourth restriction constituted by the ports 2a1 and control surface 7a1. This will reduce the pressure stepwise, with each above-described restriction having a flow cross section which is identical to that of the other restriction. All of these flow cross sections can be controlled and either increased or decreased at the same time by displacing the piston 2 vertically in the sleeve 4.

Such a displacement is effected by the interplay of pressures in the chambers 16, 19, and 20, along with the pressure of spring 27. When the pressure at the inlet side 13 of the valve 18 is greater than the pressure at the outlet side 23 by an amount superior to the force of the spring 27, the piston 2 will be moved downwardly so as to decrease the flow cross sections of the above-described restrictions and, therefore, decrease the flow along the fluid path and the pressure at the input side 13. Similarly, when the pressure at the input side 13 drops so that the pressure at the output side 23 plus the spring pressure of spring 27 is greater than this pressure the piston 2 will be moved upwardly so as to increase the flow cross sections of the above-mentioned restrictions, thereby increasing fluid flow along the path and raising the pressure at the input side.

In this manner it is possible readily to control the flow through the system, with the variable pilot valve being easily set to maintain the exact pressure drop necessary.

When a relatively weak spring 27 which exerts a modest force of less than ten bars, here five bars, is employed it is possible to control the system within very tight limits. Furthermore, since the system is stepless, the regulation is constant and is always adjusting itself to suit the exact instantaneous requirements. Due to the fact that four restrictions are provided the pressure drop at each restriction is minimal so that erosion and cavitation at the control surfaces is eliminated altogether or minimized.

It is noted that the system according to the present invention can readily function to drop a rather high pressure of, for example, 200 bars to an extremely low level, for example, five bars. It is also noted that although four restrictions are shown here, it would be possible to use more restrictions, by providing a third chamber in line with the chambers 2a and 2b, or fewer restrictions, in which case the chamber 10 would be connected directly to the passage 15.

It will be understood that each of the elements described above, or two or more together, may also find a useful application in other types of structure differing from the types described above.

While the invention has been illustrated and described as embodied in a flow-control valve, it is not intended to be limited to the details shown since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A flow-control valve assembly for connection between a source of fluid under pressure and a fluid-operated load, said assembly comprising: a main valve defining a continuous flow path having an input end connectable to said source and an output end, said valve further having a valve member defining a plurality of variable flow restrictions along said path, said valve member being longitudinally displaceable in said main valve between an open position wherein said restrictions are all of maximum flow cross section and a closed position wherein said restrictions are all of minimum flow cross section, said valve member being formed with pairs of radially spaced and of longitudinally spaced compartments and two pairs of longitudinally spaced valve-member ports opening laterally from said chamber, said main valve including a housing slidably receiving said valve member and formed with two pairs of longitudinally spaced housing ports alignable and forming four restrictions with said ports of said member, said compartment forming part of said path; a pilot valve having an input side connected to said output end and an output side connectable to said load, whereby a pressure differential is created by said pilot valve between its said sides; and means connected between said sides and said valve member for displacing said member toward said open position when said pressure differential decreases below a predetermined level and for displacing said member toward said closed position when said pressure differential increases above a predetermined level.

2. The assembly defined in claim 1 wherein said main valve includes a spring between said housing and said member urging said member into said open position.

3. The assembly defined in claim 2 wherein said spring bears on said member with a force equivalent to at most 10 bars.

4. The assembly defined in claim 1 wherein said member has a pair of oppositely directed surfaces, said means including a conduit connected to said input side of said pilot valve for applying the fluid pressure at said input side to one of said surfaces and a conduit connected to said output side of said pilot valve for applying the fluid pressure at said output side to the other of said surfaces.

5. The assembly defined in claim 1 wherein said pilot valve includes means for varying the flow cross section of said pilot valve.

6. A flow-control valve assembly for connection between a source of fluid under pressure and a fluid-operated load, said assembly comprising: a main valve defining a continuous flow path having an input end connectable to said source and an output end, said valve further having a valve member defining a plurality of variable flow restrictions along said path, said valve member being displaceable in said main valve between an open position wherein said restrictions are all of maximum flow cross section and a closed position wherein said restrictions are all of minimum flow cross section, said main valve having a housing formed with an elongated chamber and said valve member being a spool longitudinally displaceable in said chamber, said housing being formed with two pairs of longitudinally spaced housing ports opening into said chamber and with means for connecting one of said housing ports of one of said pairs of housing ports with one of said housing ports of the other of said pairs of housing ports, the other of said housing ports of said one pair of housing ports being said input end of said path and the other of said housing ports of said other pair of housing ports being said output end of said path, said spool being formed with two pairs of longitudinally spaced spool ports alignable with said housing ports and with two compartments interconnecting said spool ports, each spool port being alignable with a respective housing port and forming with the respective housing port a respective one of said restrictions whose flow cross section is variable by displacement of said spool relative to said housing, said compartment forming part of said path; a pilot valve having an input side connected to said output end and an output side connectable to said load, whereby a pressure differential is created by said pilot valve between its said sides; and means connected between said sides and said valve member for displacing said member toward said open position when said pressure differential decreases below a predetermined level and for displacing said member toward said closed position when said pressure differential increases above a predetermined level, said means including a conduit connected to said input side of said pilot valve and to said chamber for applying the pressure at said input side of said spool in one direction and a conduit connected to said output side of said pilot valve and to said chamber for applying the pressure at said output side of said spool in the opposite direction.

7. The assembly defined in claim 6 wherein said housing and spool ports are longitudinally equispaced.

* * * * *